US012612253B2

(12) United States Patent　　　　　(10) Patent No.:　US 12,612,253 B2
Moulin et al.　　　　　　　　　　　　(45) Date of Patent:　Apr. 28, 2026

(54) ORDER PICKING OR BUFFER STORAGE SYSTEM

(71) Applicant: EXOTEC PRODUCT FRANCE, Croix (FR)

(72) Inventors: Romain Moulin, Lille (FR); Renaud Heitz, Villeneuve d'Ascq (FR)

(73) Assignee: EXOTEC PRODUCT FRANCE, Croix (FR)

( * ) Notice: Subject to any disclaimer, the term of this patent is extended or adjusted under 35 U.S.C. 154(b) by 537 days.

(21) Appl. No.: 18/245,806

(22) PCT Filed: Sep. 17, 2021

(86) PCT No.: PCT/EP2021/075727
§ 371 (c)(1),
(2) Date: Mar. 17, 2023

(87) PCT Pub. No.: WO2022/058569
PCT Pub. Date: Mar. 24, 2022

(65) Prior Publication Data
US 2024/0025645 A1　　Jan. 25, 2024

(30) Foreign Application Priority Data
Sep. 18, 2020　(FR) ...................................... 2009462

(51) Int. Cl.
B65G 1/04　　　(2006.01)
B65G 1/137　　(2006.01)

(52) U.S. Cl.
CPC ......... B65G 1/1375 (2013.01); B65G 1/0478 (2013.01); B65G 1/0492 (2013.01)

(58) Field of Classification Search
CPC .. B65G 1/1375; B65G 1/0478; B65G 1/0492; B65G 1/1378; B65G 2201/0235
See application file for complete search history.

(56) References Cited

U.S. PATENT DOCUMENTS 7,381,022 B1 * 6/2008 King .................... B65G 1/1375
414/807
7,931,431 B2 4/2011 Benedict et al.
(Continued)

FOREIGN PATENT DOCUMENTS

CN　　　107635891 A　　1/2018
CN　　　110494372 A　　11/2019
(Continued)

OTHER PUBLICATIONS

International Search Report dated Dec. 14, 2021 for corresponding International Application No. PCT/EP2021/075727, filed Sep. 17, 2021.

(Continued)

*Primary Examiner* — Justin Holmes
(74) *Attorney, Agent, or Firm* — David D. Brush; Westman, Champlin & Koehler, P.A.

(57) ABSTRACT

An order picking system including: shelving units delimiting an aisle; and a self-guiding carriage having climbing elements including four sprockets each intended to cooperate with shelves or chains attached to the posts, each of the sprockets being mounted on a support movable with respect to the frame of the carriage between an extended position and a retracted position. The width or length of the carriage is less than the spacing between the posts of the first pair of posts or the second pair of posts, and the movable support is configured such that, in the deployed position, at least a portion of each of the sprockets also protrudes from an edge of the frame facing the aisle.

11 Claims, 4 Drawing Sheets

(56) References Cited

U.S. PATENT DOCUMENTS

| | | | |
|---|---|---|---|
| 2016/0016731 A1 | 1/2016 | Razumov | |
| 2016/0060037 A1 | 3/2016 | Razumov | |
| 2017/0267452 A1 | 9/2017 | Goren et al. | |
| 2018/0305126 A1 | 10/2018 | Moulin et al. | |

FOREIGN PATENT DOCUMENTS

| | | | | |
|---|---|---|---|---|
| EP | 1348646 A2 | 10/2003 | | |
| KR | 20160133487 A | * 11/2016 | ............. | B65G 1/065 |
| WO | 2010100513 A2 | 9/2010 | | |
| WO | 2016199033 A1 | 12/2016 | | |
| WO | 2020093744 A1 | 5/2020 | | |

OTHER PUBLICATIONS

Written Opinion of the International Searching Authority dated Dec. 14, 2021 for corresponding International Application No. PCT/EP2021/075727, filed Sep. 17, 2021.
Chinese Office Action dated Aug. 8, 2025 for corresponding Chinese Application No. 202180063895.1.
English translation of the Written Opinion of the International Searching Authority dated Dec. 14, 2021 for corresponding International Application No. PCT/EP2021/075727, filed Sep. 17, 2021.
French Search Report and Written Opinion dated Sep. 15, 2023 for related French Application No. 2303473, filed Sep. 17, 2021.

* cited by examiner

<u>Fig. 1</u>

ORDER PICKING OR BUFFER STORAGE SYSTEM

1. CROSS-REFERENCE TO RELATED APPLICATIONS

This Application is a Section 371 National Stage Application of International Application No. PCT/EP2021/075727, filed Sep. 17, 2021, which is incorporated by reference in its entirety and published as WO 2022/058569 A1 on Mar. 24, 2022, not in English.

2. FIELD OF THE INVENTION

The field of the invention is that of warehouse logistics and in particular the handling, storage and transport of parts or products.

More specifically, the invention relates to an order picking system or a buffer storage system.

The invention is particularly applicable to the automation of flow management in a storage warehouse, for example in an order picking warehouse in a logistics chain, or in the automation of an order delivery service at a pick-up point, commonly known as "drive-through".

3. STATE OF THE ART

In the global supply chain, the flow management and handling of products within a warehouse plays a decisive role.

Traditionally, an order picker moves around the warehouse collecting each product in an order at its location on a shelf.

It can be seen that such an organisation implies that the picker walks long distances during the working day, which causes fatigue and loss of time when the path is not optimised.

Another disadvantage is that the picker has to know the layout of the warehouse perfectly in order not to lose time.

In order to reduce travel fatigue, improve picking management and reduce order preparation time and costs, warehouses have been organised in such a way that products are picked from the shelves by robots and then transported by these same robots to order preparation stations.

One proposal was to implement self-guided carriages that are both able to drive on the floor and climb along the shelves to pick up products stored in bins.

For example, WO 2010/100513 A2 describes a robot equipped with retractable sprockets on the sides of its chassis which can be deployed laterally. These sprockets are intended to engage on vertical shelves fixed to shelves, to enable the robot to rise between two shelves in order to reach the level of a bin to be picked up.

A disadvantage of this known robot technique is that in the shelf area the robots can only move on the floor between the shelves, which can lead to bottlenecks and slows down the picking flow.

4. SUMMARY

An aspect of the present disclosure relates to a system, such as a picking system or a buffer storage system, comprising:

a first shelf and a second shelf, said first shelf and said second shelf defining an aisle;

a first pair of posts attached to said first shelf and a second pair of posts attached to said second shelf, the posts of said first pair of posts each being mounted opposite an upright of said second pair of posts;

a self-guided carriage having at least two running wheels, intended to pick up objects from at least one of said shelves, and motorised climbing means adapted to cooperate with said posts so as to allow said carriage to rise along said posts, said climbing means comprising four sprockets each intended to cooperate with shelves or chains attached to said posts of said first pair and said second pair of posts, each of the sprockets being mounted on a support which is movable relative to the frame of said carriage between two positions:

a deployed position, in which at least a portion of said gear mounted on said support projects laterally from said frame;

a retracted position, in which the gear mounted on said support is housed in or above said frame.

According to the invention, the width or length of said carriage is less than the spacing between the posts of said first pair of posts or said second pair of posts and said movable support is configured such that, in said deployed position, at least a portion of each of said sprockets also protrudes from an edge of said frame facing said aisle.

Thus, in a novel and particularly clever way, the invention proposes to use sprockets that can be deployed both on the sides and on the front or rear of the robot to enable a carriage to climb onto the shelves, but also to be able to move under the shelves, which makes it possible to optimise the path of the robots, and in particular to reduce the distance covered on the ground by the robots and to avoid the risks of traffic conflicts between two robots by significantly multiplying the possibilities of alternative routes, and in fine to greatly increase the flow of order preparation in a warehouse or the number of goods that can be stored, or retrieved, per hour in a buffer storage installation. In addition, thanks to the invention, two carriages can climb between the first and second shelves in adjacent vertical shafts, each delimited by a first pair of posts attached to the first shelf and by a second pair of posts attached to the second shelf, facing each other, which share a common upright for each shelf, which makes it possible to optimise the flow of traffic for the robots.

In a particular embodiment of the invention, in said deployed position, the axes of said sprockets are at an angle of between 0 and 70° with respect to a direction perpendicular to the axis of said aisle and in that said racks or chains are rotated by the same angle with respect to a direction perpendicular to the axis of said aisle.

In variants of this particular embodiment of the invention, it may also be envisaged that in said deployed position the axes of said sprockets form an angle of between 70 and 90° with respect to a direction perpendicular to the axis of said lane.

According to a particular embodiment of the invention, in said deployed position, the axes of said sprockets are substantially perpendicular to the axis of said aisle.

In a particular embodiment of the invention, said movable supports are pivotally mounted with respect to said frame.

In another particular embodiment of the invention, said movable supports are slidably mounted with respect to said frame.

According to a particular aspect of the invention, said movable supports are mounted substantially at the four corners of the frame of said carriage.

In a particular embodiment of the invention, said carriage comprises means for pivoting said running wheels about a vertical axis through at least 90°.

According to a particular aspect of the invention, said racks are formed in one piece with said posts.

Advantageously, said carriage has means for gripping an object storage bin.

Preferably, the lower shelf of said first shelf and/or said second shelf is mounted at a height greater than the combined height of said carriage and a bin carried thereon.

This allows the robot to pass under the shelves with a bin.

In one embodiment of this particular mode of operation of the invention, the lower shelf of said first shelf and/or said second shelf is mounted at a height greater than the combined height of said carriage and two bins carried thereon.

According to an advantageous aspect, a system as described above comprises a third shelf adjoining said first shelf, on the opposite side of said aisle, and said first shelf and said third shelf have a sufficient depth to place on their shelves two bins for storing objects one behind the other.

This allows for the creation of clearance areas underneath the shelves, which facilitate the passing of two carriages along the length of the shelf.

According to a particular aspect of the invention, said carriage has four independent motors each intended to drive one of said sprockets.

5. LIST OF FIGURES

Other features and advantages of the invention will become clearer on reading the following description of one embodiment of the invention, given merely as an illustrative and non-limiting example, and of the appended drawings, among which:

6. DETAILED DESCRIPTION OF THE INVENTION

Figure 1:
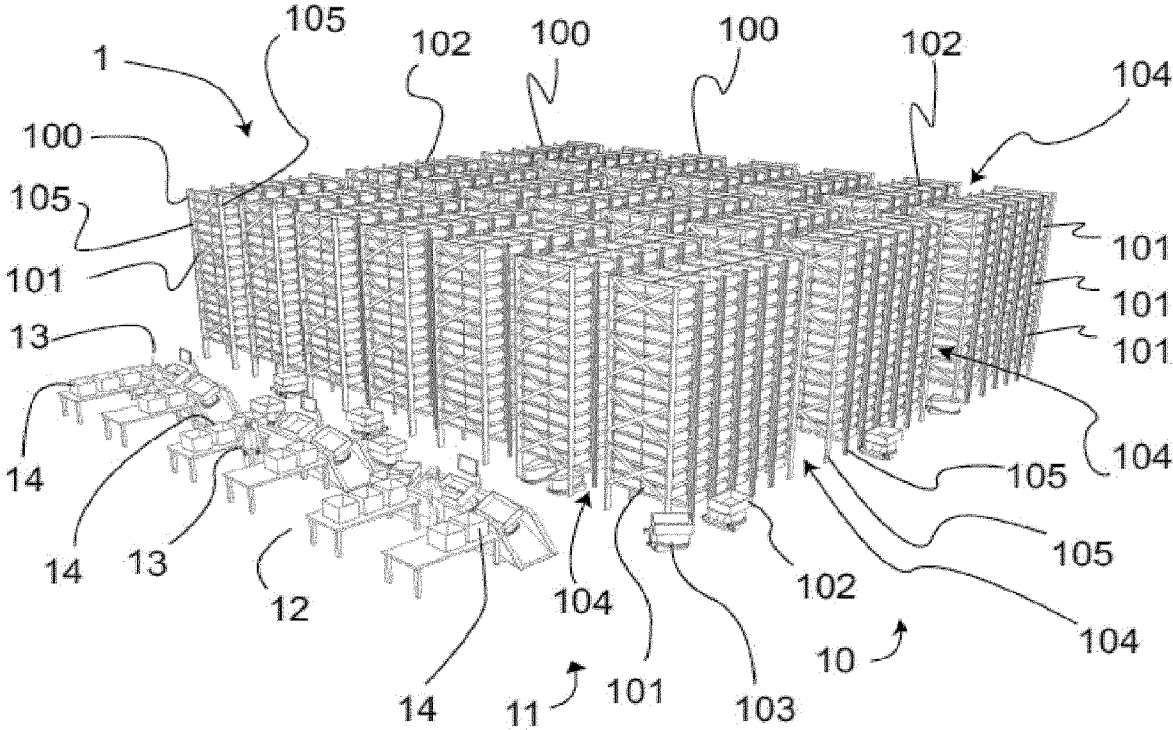
FIG. 1 is a schematic perspective view of a warehouse equipped with an example of an embodiment of an order picking system according to the invention.

FIG. 1 shows a warehouse 1 for storing products for shipment. This warehouse is divided into a storage area 10 and an order picking area 11.

In the preparation area 11 there are order picking stations 12 at which operators 13 prepare packages 14 with the items of an order.

The storage area 10 is organised in shelves 100 with shelves 101 on several levels supported by posts 105, on which shelves 101 are stored bins 102 which contain the stored products or articles.

A fleet of Automatic Guided Vehicles (AGVs), also called self-guided carriage, 103 transports the bins 102 between the storage area 10 and the order picking stations 12.

When a robot 103 receives information on the location of a bin 102 containing one or more items to be picked to complete an order processed by one of the operators 13, the robot 103 rolls along the floor to the foot of the shelf 100 where the bin 102 is stored and positions itself in the aisle 104 between this shelf 100 and the shelf opposite it. It then climbs, supported by these two shelves, to the shelf 101 where the bin 102 is stored and removes it from the shelf. The robot 103 then descends between the two shelves, and once on the ground, transports the bin 102 to the order picking station 12 by using the aisles and/or passing under the shelves. The operator 13 only has to pick the quantity of items ordered and pack them.

Figure 2:
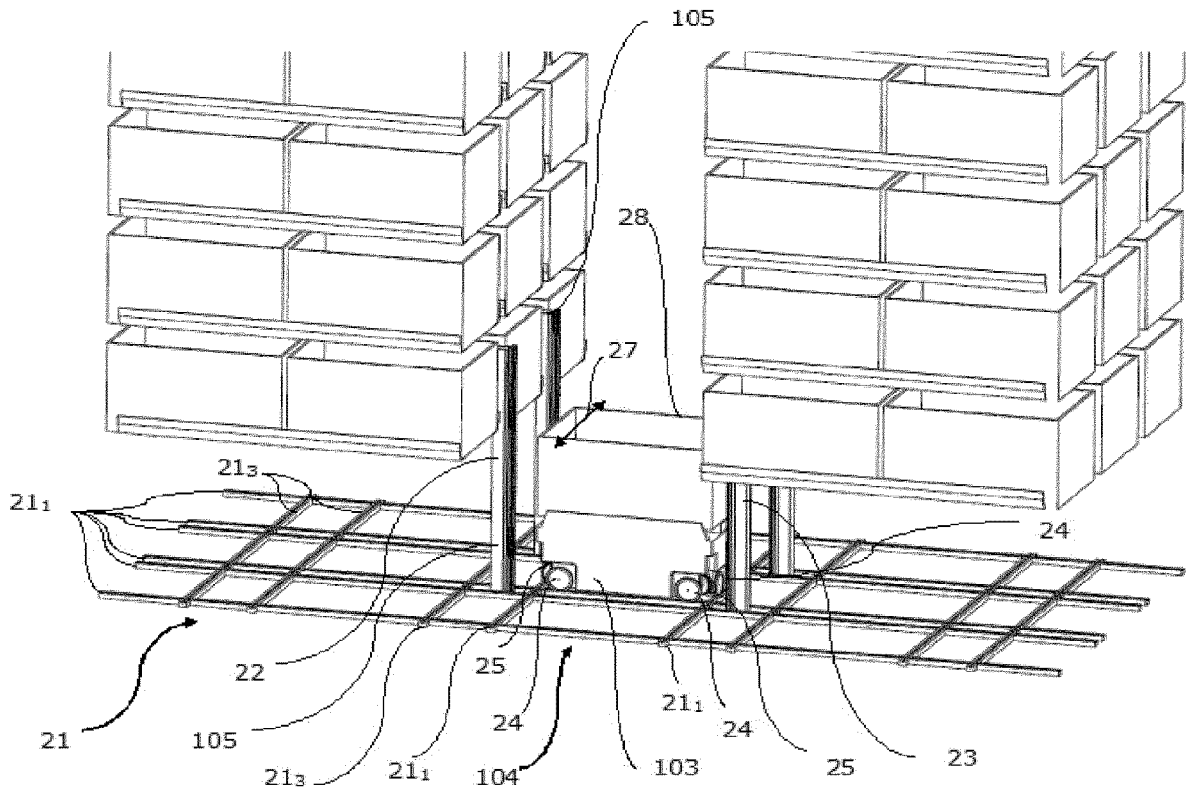
FIG. 2 is a schematic perspective detail of the system according to the invention implemented in the warehouse illustrated with reference to FIG. 1, in which a self-guided carriage positioned in an aisle at the foot of two opposing shelves.

As can be seen in FIG. 2, in a detail view of the robot 103 positioned in an aisle 104 at the foot of two shelves 22 and 23, the robot 103 runs on the ground on a network 21 of rails formed by parallel rails $21_1$ or $21_3$ oriented in line with the shelves and rails $21_2$ oriented perpendicular to the shelves. Two rails $21_1$ are arranged on the edges of the aisle 104 to enable the robot to move along the aisle.

The rails $21_2$ extend under the shelves 22 and 23, between the feet of the posts 105 of the latter, which allows the robot to move under the shelves, in a direction perpendicular to the aisle 104. Furthermore, additional rails $21_3$ extending parallel to the aisle 104 are also provided under the shelves between the feet of the posts 105 to allow the robot 103 to move under the shelves and along their length.

In order to travel on these rails $21_1$ and $21_2$, the robot 103 is equipped, on each of its four sides, with a pair of wheels 24. These pairs of wheels 24 are each mounted on a support (not shown in FIG. 2) which slides vertically and is driven by a motor, allowing four wheels to rest on the rails while the other wheels are raised. By simply changing the selection of wheels to rest on the rails, it is then possible to change the direction of the robot 103.

The robot 103 carries a bin 28 which is shorter and wider than the robot frame 26.

It should be noted that the width of the robot (shown by the double arrow 27 in FIG. 2) is, in this particular embodiment of the invention, advantageously less than the spacing between two posts 105 of the shelf 22 or 23 in order to allow the robot to pass between these posts.

In an alternative embodiment of the invention, it may also be provided that the length of the robot is less than the spacing between two posts of the same shelf to allow the robot to pass between the posts when it is rotated a quarter turn in the aisle and its longer side faces the shelf.

It can also be seen in FIG. 2 that the robot 103 is equipped at the four corners of its frame 26 with motorised retractable sprockets 25, housed in the frame 26 in the position shown in FIG. 2.

These sprockets 25 are carried by motorised movable arms 32 which can be pivoted in a vertical plane relative to the frame, upwards to extend the sprockets 25, or downwards to retract the sprockets 25 within the frame 26.

Figure 3:
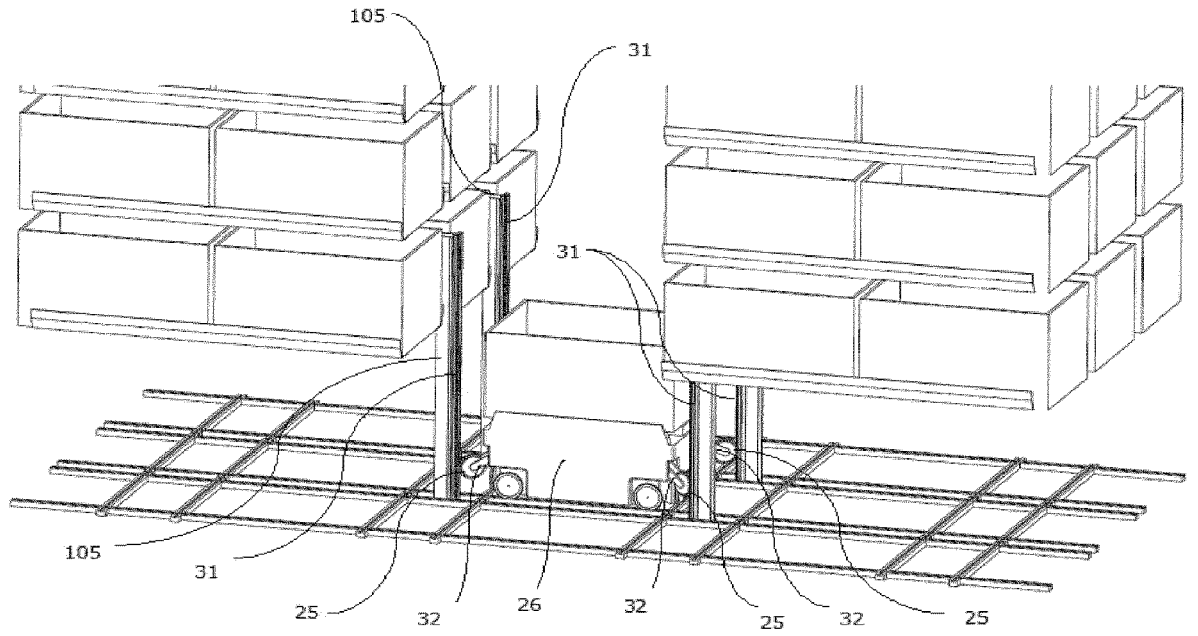
FIG. 3 is a schematic perspective view of the carriage shown in FIG. 2 climbing between two shelves.

In order to climb between the two shelves 22 and 23, the robot 103 deploys, by pivoting the supports 32, the sprockets 25 out of the frame 26 in the extension of the diagonals of the frame until the sprockets come into contact and can mesh with racks 31 fixed to the posts 105, as can be seen in FIG. 3.

It should be noted that, in this particular embodiment of the invention, the racks 31 are rotated with respect to a direction perpendicular to the axis of the aisle 104 by an angle of the same value as the inclination of the axes of the sprockets 25 with respect to a direction perpendicular to the axis of the aisle 104.

Figure 4:
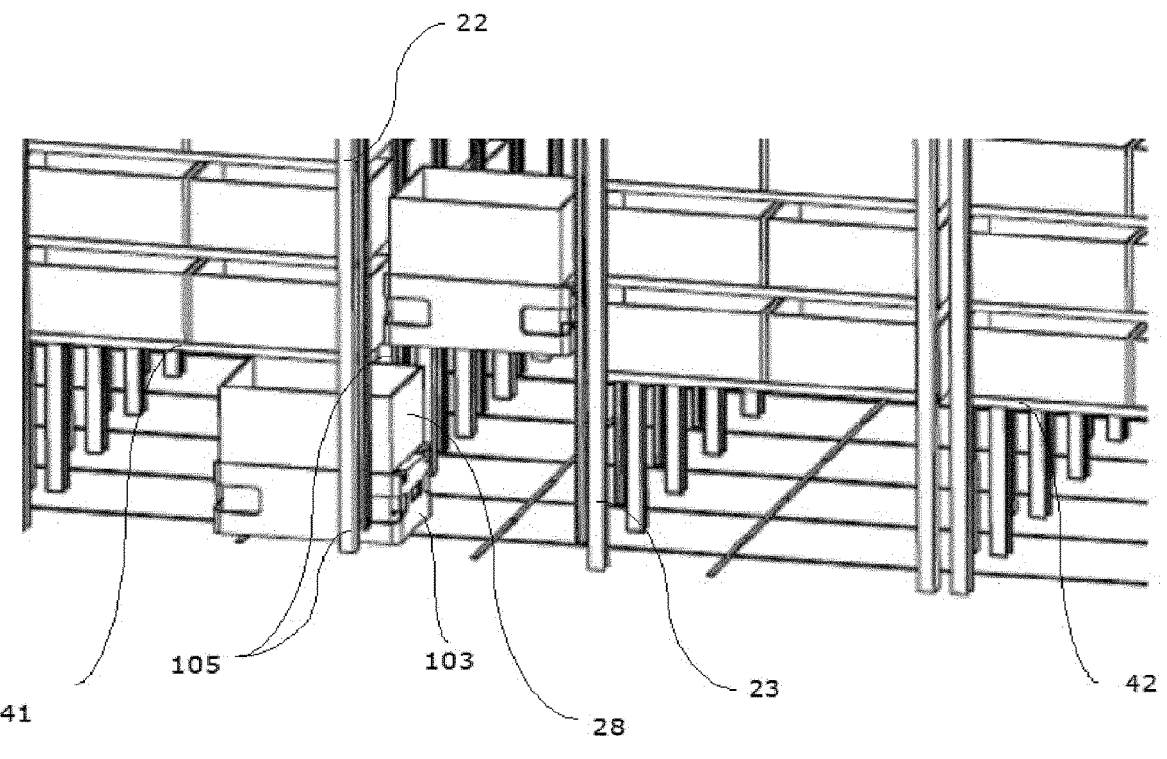
FIG. 4 is a view of the carriage shown with reference to FIG. 2 carrying a bin and reaching under a shelf.

FIG. 4 shows a robot 103 which, after picking up a bin from the shelf 23, moves underneath it.

As can be seen in this figure, the lower shelf 41 of the shelf 22 is advantageously fixed at a height greater than the combined height of the carriage 103 and the bin 28 to allow the robot to move under the shelf with the bin 28.

Figure 5:
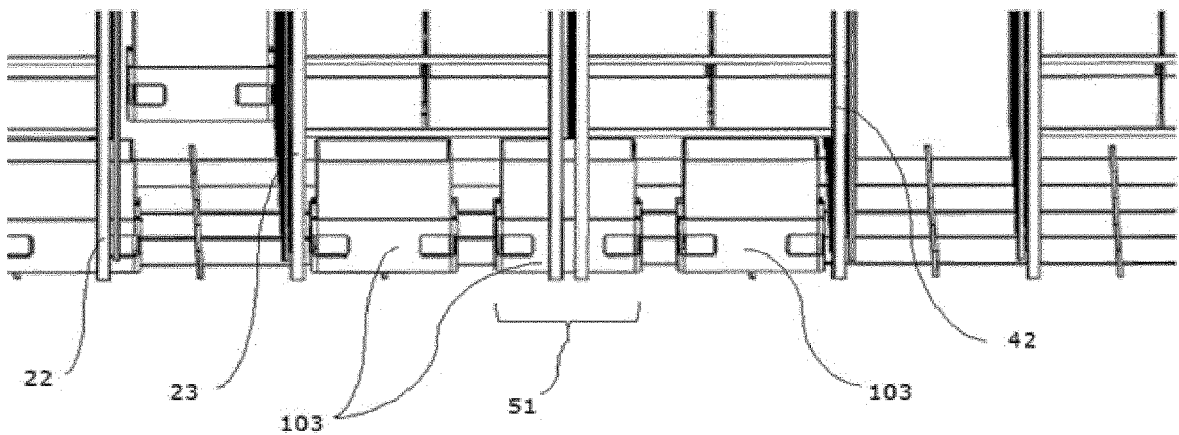
FIG. 5 is a detailed perspective view of the system shown with reference to FIG. 2, in which three carriages are shown under two adjoining shelves, one of which is parked on a clearance area.

It will also be noted that in this particular embodiment of the invention, a third shelf 42 is adjoined to the second shelf 23, on the side opposite the aisle 104. Furthermore, it will be observed that the depth of the shelf 23 and the shelf 42 has been dimensioned to be able to place two rows of bins 28 one behind the other on each of their shelves. This makes it possible, as illustrated in FIG. 5, to create clearance areas 51 astride the two shelves where a robot 103 can temporarily park, thus facilitating the crossing of robots circulating under shelf 23 or shelf 42, along the length of these shelves.

In variations of this particular embodiment of the invention, it may also be envisaged to implement a system as described above for the buffer storage of bins or bins containing products or items to be delivered to a pick-up point of a drive-through, without departing from the scope of the invention.

One or more exemplary embodiments overcome one or more of the above-mentioned drawbacks of the state of the art.

More specifically, an exemplary embodiment provides an order picking technique that optimises the flow of goods within a warehouse.

An exemplary embodiment provides a picking technique that is simple to implement and inexpensive.

An exemplary embodiment provides a picking technique that can be adapted to existing shelving.

Although the present disclosure has been described with reference to one or more examples, workers skilled in the art will recognize that changes may be made in form and detail without departing from the scope of the disclosure and/or the appended claims.

The invention claimed is:

1. A system, such as an order picking system or a buffer storage system, comprising a first shelf and a second shelf, said first shelf and said second shelf defining an aisle;

a first pair of posts attached to said first shelf and a second pair of posts attached to said second shelf, the posts of said first pair of posts each being mounted opposite an upright of said second pair of posts;

a self-guided carriage having at least two running wheels that are pivotal on the carriage about a vertical axis through at least 90°, for picking up objects from at least one of said shelves, and a motorised climbing element adapted to cooperate with said posts so as to allow said carriage to rise along said posts said climbing element comprising first, second, third and fourth sprockets each designed to cooperate with a rack or a chain integral with a post of said first pair and said second pair of posts, each of the sprockets being mounted on a support movable relative to the frame of said carriage between positions including:

a deployed position, in which at least a portion of said sprocket mounted on said support projects laterally from said frame;

a retracted position, in which the sprocket mounted on said support is housed in or above said chassis, wherein a width or length of said carriage is less than a spacing between the posts of said first pair of posts or said second pair of posts, and wherein said movable support is configured such that, in said deployed position, at least a portion of each of said sprockets also protrudes from an edge of said frame facing said aisle.

2. The system according to claim 1, wherein, in said deployed position, axes of said sprockets form an angle between 0 and 70° with respect to a direction perpendicular to the axis of said aisle and said shelf or chain is rotated by the same angle with respect to a direction perpendicular to an axis of said aisle.

3. The system according to claim 1, wherein, in said deployed position, the axes of said sprockets are substantially perpendicular to the axis of said aisle.

4. The system according to claim 1, wherein said movable supports are pivotally mounted with respect to said frame.

5. The system according to claim 1, wherein said movable supports are slidably mounted with respect to said frame.

6. The system according to claim 1, wherein said movable supports are mounted substantially at four corners of the frame of said carriage.

7. The system according to claim 1, wherein said racks are formed integrally with said posts.

8. The system according to claim 1, wherein said carriage has a gripping element for gripping an object storage bin.

9. The system according to claim 1, wherein a lower shelf of said first shelf and/or said second shelf is mounted at a height higher than a combined height of said carriage and a bin carried thereon.

10. The system according to claim 8, wherein the system comprises a third shelf adjoining said first shelf, on an opposite side to said aisle, and said first shelf and said third shelf have a depth sufficient on which to place two bins for storing objects one behind the other.

11. The system according to claim 1, wherein said carriage has first, second, third and fourth independent motors each for driving one of said sprockets.

* * * * *